(12) United States Patent
Ahuja et al.

(10) Patent No.: US 8,230,425 B2
(45) Date of Patent: Jul. 24, 2012

(54) ASSIGNING TASKS TO PROCESSORS IN HETEROGENEOUS MULTIPROCESSORS

(75) Inventors: Manish Ahuja, Pflugerville, TX (US); Nathan Fontenot, Cedar Park, TX (US); Jacob L. Moilanen, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 11/830,588

(22) Filed: Jul. 30, 2007

(65) Prior Publication Data

US 2009/0037911 A1    Feb. 5, 2009

(51) Int. Cl.
G06F 9/46    (2006.01)
G06F 9/455   (2006.01)
G06F 9/44    (2006.01)
G06F 15/76   (2006.01)

(52) U.S. Cl. ............. 718/102; 718/1; 712/32; 712/200

(58) Field of Classification Search .................. None
See application file for complete search history.

(56) References Cited

U.S. PATENT DOCUMENTS

| 3,631,405 | A   | * | 12/1971 | Hoff et al. ............. 712/209 |
| 6,513,057 | B1  | * | 1/2003  | McCrory .............. 718/102 |
| 6,957,435 | B2  |   | 10/2005 | Armstrong |
| 7,080,242 | B2  |   | 7/2006  | Morris |
| 7,554,909 | B2  | * | 6/2009  | Raghunath et al. ....... 370/230 |
| 2004/0088524 | A1 | * | 5/2004 | Chauvel et al. .......... 712/205 |
| 2004/0098718 | A1 | * | 5/2004 | Yoshii et al. ............. 718/100 |
| 2005/0240925 | A1 | * | 10/2005 | Ault et al. ............... 718/100 |
| 2007/0033592 | A1 |   | 2/2007  | Roediger et al. |
| 2008/0127181 | A1 | * | 5/2008  | Allard et al. ................ 718/1 |

FOREIGN PATENT DOCUMENTS

EP    1 387 259 A2    2/2004

OTHER PUBLICATIONS

Exploring Salvage Techniques for Multi-core Architectures Russ Joseph in Proceedings of the 2nd Workshop on High Performance Computing Reliability Issues Published: Feb. 2006.*

(Continued)

*Primary Examiner* — Emerson Puente
*Assistant Examiner* — Paul Mills
(74) *Attorney, Agent, or Firm* — Kolisch Hartwell, PC; Steven L. Bennett

(57) ABSTRACT

Methods and arrangements of assigning tasks to processors are discussed. Embodiments include transformations, code, state machines or other logic to detect an attempt to execute an instruction of a task on a processor not supporting the instruction (non-supporting processor). The method may involve selecting a processor supporting the instruction (supporting physical processor). In many embodiments, the method may include storing data about the attempt to execute the instruction and, based upon the data, making another assignment of the task to a physical processor supporting the instruction. In some embodiments, the method may include representing the instruction set of a virtual processor as the union of the instruction sets of the physical processors comprising the virtual processor and assigning a task to the virtual processor based upon the representing.

21 Claims, 4 Drawing Sheets

OTHER PUBLICATIONS

Single-ISA Heterogeneous Multi-Core Architectures for Multithreaded Workload Performance Rakesh Kumar, Dean M. Tullsen, Parthasarathy Ranganathan, Norman P. Jouppi, and Keith I. Farkas Proceedings of the 31st Annual International Symposium on Computer Architecture Published: 2004.*

A Heterogeneous Multiprocessor Architecture for Workstations Richard Balkowski and Eduardo B. Fernandez Published: 1991.*

A Heterogeneous Multiprocessor Architecture for Workstations Richard Bealkowski Dissertation, Florida Atlantic University Dec. 1989.*

* cited by examiner

ASSIGNING TASKS TO PROCESSORS IN HETEROGENEOUS MULTIPROCESSORS

FIELD

The present invention is in the field of multiprocessor computer systems. More particularly, the present invention relates to methods and arrangements to assign an instruction to a processor which supports the instruction on a heterogeneous multiprocessor computer system.

BACKGROUND

Despite the enormous improvement in speed obtained from integrated circuitry, the demand for ever faster computer systems has continued. The overall speed of a computer system may be typically improved by increasing parallelism, and specifically, by employing multiple CPUs (also referred to as processors). The modest cost of individual processors packaged on integrated circuit chips has made multi-processor systems practical, although such multiple processors add more layers of complexity to a system.

In this scenario, symmetric multiprocessors may use identical or similar processors. Computing tasks may be distributed based on availability and typically without regard to differences in processor capabilities. Ideally, all processors in a symmetric multiprocessor system would share the same instruction set. However, in practice, this is not always the case.

A heterogeneous multiprocessor may provide a cost-effective method of upgrading, enabling the combination of older and newer processors. For example, partially populated multiprocessor systems are often purchased for an affordable entry price and future expandability. As purchased, the system might have, for example, four identical processors and an additional number, such as 60, of empty processor sockets. Over the course of the system's useful lifetime, the processor manufacturer may discontinue the original processor in favor of more advanced or more affordable (but more limited) versions of the same processor family. Thus, processors added to the original configuration might provide for additional instructions and might exclude some instructions implemented by the original processors.

Processor architectures (e.g., Power™, x86, etc.) are commonly viewed as static and unchanging. This perception is inaccurate, however, because processor architectures are properly characterized as extensible. Although the majority of processor functions typically do remain stable throughout the architecture's lifetime, new features are added to processor architectures over time. A well known example of this extensibility of processor architecture was the addition of a floating-point unit to the x86 processor architecture, first as an optional co-processor, and eventually as an integrated part of every x86 processor chip. As another example, Power5™ has no AltiVec™ instructions while the POWERPC® 970 (PPC 970) does. Similarly, Power6™ has support for decimal floating point while neither Power5™ nor PPC 970 does. AltiVec™ is a form of single instruction, multiple data instruction that may be especially useful for processing vectors. Thus, even within the same processor architecture, the features possessed by one processor may differ from the features possessed by another processor.

Problems may arise in attempting to exploit new or otherwise non-standard features available in the context of heterogeneous processor environments. In heterogeneous multiprocessors with the processors supporting different instruction sets, instructions may be assigned to processors which do not support them. Efforts to solve the problem may be unsatisfactory. One solution is to allow only instructions that can be executed on all of the processors. This solution may deprive users of the computer of the efficiencies built into a non-standard instruction.

Another remedy may examine the support set needed for the instructions in a task before assigning the task to a processor. This remedy may, however, be inefficient. Instructions unsupported by one or more processors may be relatively rare. Examining a large group of binary instructions may be time consuming. In computers with time slices, an examination of instructions may include instructions not going to be run in the next time slice. Further, some code may not run completely on a single processor. Running the code may require assigning it to one processor for execution of some of the instructions and to another processor for execute of other instructions.

SUMMARY OF THE INVENTION

The problems identified above are in large part addressed by methods and arrangements of assigning tasks to processors. One embodiment provides a method of assigning tasks to processors. The method may involve detecting an attempt to execute an instruction of a task on a processor not supporting the instruction (non-supporting processor). The method may also involve selecting a processor supporting the instruction (supporting physical processor).

In many embodiments, the method may include storing data about the attempt to execute the instruction and, based upon the data, making another assignment of the task to a physical processor supporting the instruction. In some embodiments, the method may include representing the instruction set of a virtual processor as the union of the instruction sets of the physical processors comprising the virtual processor and assigning a task to the virtual processor based upon the representing. In a few embodiments, the method may include detecting an attempt to execute an instruction of a process. In some embodiments, the method may include detecting an attempt to execute an instruction of a thread. In many embodiments, the method may include a hypervisor assigning the task to the physical processor by a hypervisor. In other embodiments, the method may include a kernel of an operating system assigning the task to the physical processor by a hypervisor.

In several embodiments, the method may include representing the instruction set of a heterogeneous multiprocessor computer as the union of the instruction sets of the physical processors comprising the computer.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of assigning tasks to processors are contemplated. Embodiments include transformations, code, state machines or other logic to detect an attempt to execute an instruction of a task on a processor not supporting the instruction (non-supporting processor). The method may involve selecting a processor supporting the instruction (supporting physical processor). In many embodiments, the method may include storing data about the attempt to execute the instruction and, based upon the data, making another assignment of the task to a physical processor supporting the instruction. In some embodiments, the method may include representing the instruction set of a virtual processor as the union of the instruction sets of the physical processors comprising the virtual processor and assigning a task to the virtual processor based upon the representing. In a few embodiments, the method may include detecting an attempt to execute an instruction of a process. In some embodiments, the method may include detecting an attempt to execute an instruction of a thread. In many embodiments, the method may include a hypervisor assigning the task to the physical processor by a hypervisor. In other embodiments, the method may include a kernel of an operating system assigning the task to the physical processor by a hypervisor.

While specific embodiments will be described below with reference to particular circuit or logic configurations, those of skill in the art will realize that embodiments of the present invention may advantageously be implemented with other substantially equivalent configurations.

Figure 1:
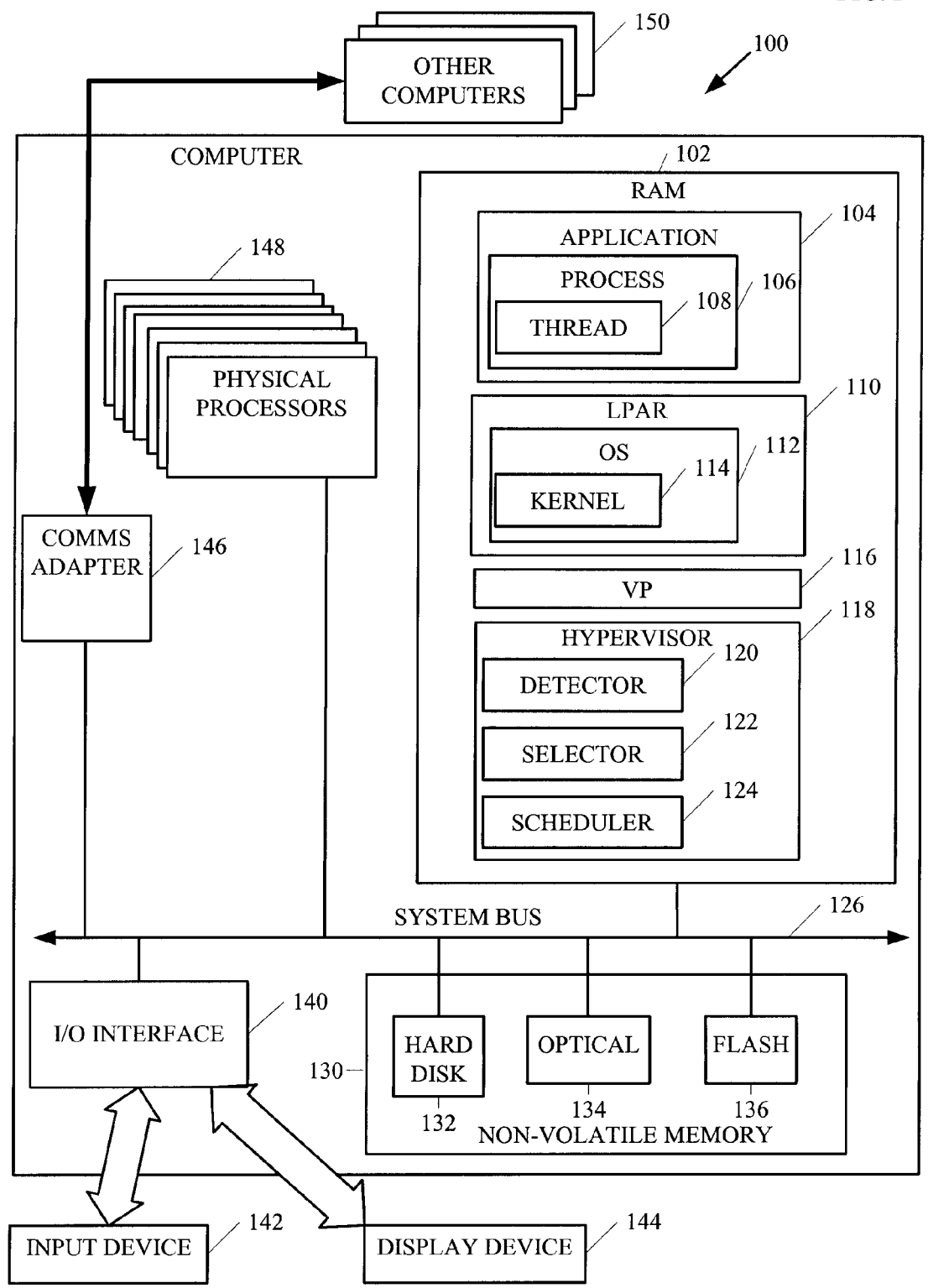
FIG. 1 sets forth a block diagram of an embodiment of a heterogeneous multiprocessor computer to assign tasks to physical processors supporting the tasks.

FIG. 1 sets forth a diagram of an embodiment of a heterogeneous multiprocessor computer 100 capable of assigning instructions to processors which support them. The computer 100 of FIG. 1 includes RAM 102, non-volatile memory 130, an I/O interface device 140, a communications adapter 146, and multiple physical processors 148 which are connected through a system bus 126. The physical processors 148 may differ in the instructions which they support.

Stored in RAM 102 is application program 104, logical partition 110 (LPAR), virtual processor 116, and hypervisor 118. Application program 104 consists of computer program instructions for user-level data processing. Application program 104 may run in a separate logical partition. Application program 104 includes a process 106 which includes a thread 108. Process 106 may be the run-time representation of application program 104. Process 106 may include a description of the resources used by application program 104 such as memory areas, usage of I/O devices and the relationship of process 106 to other processes contained in RAM 102. Thread 108 may comprise a lightweight process, a flow of execution within process 106.

A logical partition such as LPAR 110 is a subset of the resources of a computer organized and operated as a separate virtual computer. Each logical partition operates independently of other logical partitions on the same computer. Each logical partition runs its own operating system and its own application programs, and each logical partition is assigned all the resources it needs to operate as though it were an independent computer, including processor capacity, memory, and I/O resources. Logical partitions may be implemented as dedicated partitions, supported by virtual processors having assigned physical processors. Logical partitions also may be implemented as shared processor partitions, supported by pools of virtual processors where each pool has assigned physical processors, such as some of the physical processors 148. Logical partitioning is generally code-enforced. Physical reconfiguration of a computer system may not be required to change the logical partitioning.

LPAR 110 includes operating system 112 which includes kernel 114. Operating systems useful in logical partitions of computers that detect an attempt to execute an instruction on a processor which does not support the instruction and that reassign execution of the instruction to another processor which supports the instruction include UNIX™, Linux™, Microsoft Windows XP™ and Vista™, AIX™, IBM's i5/OS™, and others as will occur to those of skill in the art.

Kernel 114 may comprise a fundamental part of operating system 112 that resides in memory and provides the basic services. Kernel 114 may be the component of operating system 112 that is closest to the hardware level of computer 100. Kernel 114 may activate the hardware directly or may interface to another software layer, such as hypervisor 118, which drives the hardware. Kernel 114 may, for example, assign a task, such as execution of a process or thread, to a virtual processor, such as virtual processor 116. Virtual processor 116 consists of data structures and computer program instructions representing assignments of physical processor resources to logical partitions such as LPAR 110.

Hypervisor 118 may comprise computer program instructions for managing LPARs. The hypervisor 118 may administer the assignment of physical resources such as memory and processing resources to LPARs, control the physical memory locations that can be accessed from within an LPAR, and control access to I/O memory space. In addition, the hypervisor 118 may schedule virtual processors such as VP 116 on physical processors such as the physical processors 148 and may administer the assignment of virtual processors to LPARs. Hypervisor 118 may, for example, manage time slicing and dispatching partitions across the physical processors such as physical processors 148.

In the example of FIG. 1, hypervisor 118 may act as an intermediary between commands or instructions generated by application 104 and OS 112 and execution on the hardware. Hypervisor 118 may enforce logical partitioning of processor resources by presenting a partitioned view of hardware to the task dispatchers of application 104 and OS 112. For example, dispatchers in OS kernel 114 may dispatch tasks to virtual processors such as virtual processor 116. Hypervisor 118 in turn may dispatch virtual processors such as VP 116 to the physical processors 148 for execution of the underlying task. Hypervisor 118 may, for example, receive from kernel 114 an assignment of a task to virtual processor 116 and may realize the assignment as an assignment of the task to a time slice in one of the physical processors 148.

Hypervisor 118 may also enforce partitioning of other resources, such as allocations of memory to partitions, and routing I/O to I/O devices associated with the proper partition. Hypervisor 118 may contain state data. Some of the state data may be stored in special purpose registers, while some may be stored in tables or other structures. This state data may define the allocation of resources in logical partitions such as LPAR 110. The allocation of resources may be altered by changing the state data of hypervisor 118 rather than by physical reconfiguration of hardware.

In systems based upon IBM POWER™ microprocessors, a POWER hypervisor may be a basic component of system firmware that is always active, regardless of the system configuration. A POWER Hypervisor may:

provide an abstraction between the physical hardware resources and the logical partitions that use them, enforce partition integrity by providing a security layer between logical partitions, save and restore all processor state information during logical processor context switch, control hardware I/O interrupt management facilities for logical partitions, and provide virtual LAN channels between physical partitions that help to reduce the need for physical Ethernet adapters for inter-partition communication.

In the embodiment of FIG. 1, hypervisor 116 includes detector 120, selector 122, and scheduler 124. Detector 120 may handle an exception generated by one of physical processors 148 attempting to execute an instruction which the physical processor does not support. Detector 120 may determine whether any of the other physical processors 148 supports the instruction. If so, selector 122 may select a replacement processor to take over execution of the task, such as a process or a thread, which contains the instruction. Scheduler 124 may schedule the execution on the replacement processor. For example, scheduler 124 may schedule the task on a time slice of the replacement processor.

Heterogeneous multiprocessor computer 100 of FIG. 1 includes non-volatile computer memory 130 coupled through system bus to the physical processors 148 and to other components of the computer 100. Non-volatile computer memory 130 may be implemented as a hard disk drive 132, optical disk drive 134, electrically erasable programmable read-only memory space, so-called "EEPROM" or "Flash" memory 136, RAM drives not shown, or as any other kind of computer memory as will occur to those of skill in the art.

Hypervisor 118, virtual processor 116, operating system 112, kernel 114, LPAR 110, and application program 104 in the example of FIG. 1 are shown in RAM 102, but many components of such software typically are stored in non-volatile memory 130 also. In many embodiments, a hypervisor is part of firmware, which is a form of non-volatile memory.

The example heterogeneous multiprocessor computer 100 of FIG. 1 includes one or more input/output interface adapters 140. Input/output interface adapters in computers implement user-oriented input/output through, for example, software drivers and computer hardware for controlling output to display devices 144 such as computer display screens, as well as user input from user input devices 142 such as keyboards and mice.

The exemplary heterogeneous multiprocessor computer 100 of FIG. 1 includes a communications adapter 146 for implementing data communications with other computers 150. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet IEEE 802.3 adapters for wired network communications, and 802.11a, b, g, or n adapters for wireless network communications.

The system of FIG. 1 is for explanation and not for limitation. Heterogeneous multiprocessor computer to assign tasks to physical processors supporting the tasks may omit some of the components shown in FIG. 1 or may add components not shown, as will occur to those of skill in the state of the art. For example, some embodiments of these systems may operate without hypervisors, logical partitions, or virtual partitions. In many embodiments, an operating system, a kernel of an operating system, or even a module of an application program may detect that a task has been assigned to a physical processor which does not support one of the instructions of the task and may assign the task to a physical processor which does support the instruction.

Figure 2:
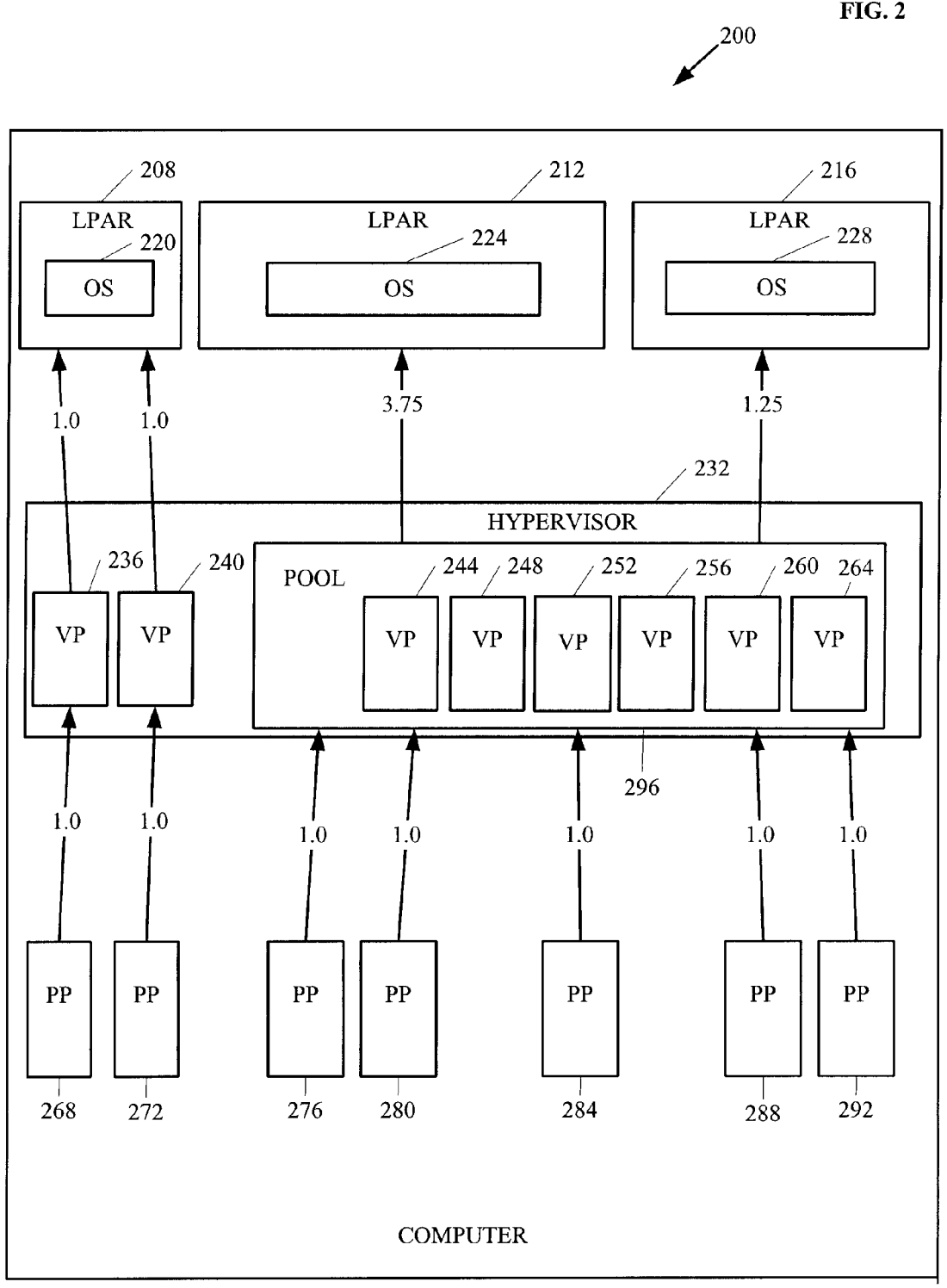
FIG. 2 depicts an embodiment of partitioned heterogeneous multiprocessor computer to assign tasks to physical processors supporting the tasks.

FIG. 2 sets forth a block diagram of an exemplary heterogeneous multiprocessor computer 200 for assigning for execution a task containing an instruction to a processor supporting the instruction. Heterogeneous multiprocessor computer 200 includes LPARs 208, 212 and 216, hypervisor 232, and physical processors (PP) 268, 272, 276, 280, 284, 288 and 292. Each LPAR 208, 212 and 216 has an operating system running in it (220, 224, and 228, respectively) and each operating system 220, 224, and 228 may be different. A system with three LPARs, for example, may simultaneously ran Linux™ in one LPAR, IBM's AIX™ in another LPAR, and IBM's i5/OS in another LPAR. Hypervisor 232 is a layer of system software that manages LPARs. Hypervisor 232 includes virtual processors (VP) 236 and 240 and processor pool 296 which includes virtual processors 244, 248, 252, 256, 260, and 264.

Physical processors 268 and 272 are assigned exclusively to LPAR 208 through virtual processors 236 and 240. An LPAR to which one or more physical processors are so exclusively dedicated is a "dedicated partition." Physical processors 276, 280, 284, 288 and 292 in this example are assigned to pool 296, so that the processing capacity of physical processors 276, 280, 284, 288 and 292 is shared by LPARs 212 and 216 through the virtual processors 244, 248, 252, 256, 260, and 264. LPARs 212 and 216 share physical processors indirectly through pooled virtual processors, each of which represents all or part of the processing capacity of a physical processor assigned by a hypervisor 232 to each such LPAR 212 and 216. Such an LPAR, that indirectly shares physical processors through pooled virtual processors, is a "shared processor partition."

In the example of FIG. 2, arrows drawn among the physical processors, virtual processors, the pool, and the LPARs represent processing capacity assigned to LPARs, virtual processors, and the pool. The numbers designate units of a physical processor assigned. In the example, physical processors may only be assigned as one whole processor to a virtual processor 236 or 240 or to the pool 296. The virtual processors 236 and 240 assigned to a dedicated LPAR 208 each represents the processing capacity of 1.0 physical processor. All the processing capacity of the five physical processors 276, 280, 284, 288 and 292 is assigned to shared processor LPARs 212 and 216 through pool 296, with the processing capacity of 3.75 physical processors assigned to LPAR 212 and the processing capacity of 1.25 processors assigned to LPAR 216.

In the example of FIG. 2, one of the physical processors 268, 272, 276, 280, 284, 288 or 292 may attempt to execute an instruction which it does not support and may generate an exception. Hypervisor 232 may receive the exception and assign the task which includes the instruction to another physical processor 268, 272, 276, 280, 284, 288 or 292. In some embodiments, hypervisor 232 may attempt to preserve the structure of assignments of physical processors to LPARs illustrated in FIG. 2. Thus, for example, if physical processor 268 did not support an instruction, hypervisor 232 may remove the task and attempt to assign the task to physical processor 272, which is assigned to the same LPAR 208. Similarly, if one of the pooled physical processors 276, 280, 284, 288 or 292 did not support an instruction, hypervisor 232 may attempt to assign the task which includes the instruction to another of the pooled physical processors.

In some embodiments, the hypervisor 232 may represent the instruction set of one of the virtual processors 236, 240, 244, 248, 252, 256, 260, and 264 as the union of the instruction sets of the physical processors assigned to the same logical partitions. For example, virtual processors 236 and 240 are assigned to LPAR 208. Physical processors 268 and 272 are also assigned to LPAR by assignment to virtual processors 236 and 240, respectively. Thus, hypervisor 232 may represent the instruction set of either virtual processor as the union of the instruction sets of physical processors 268 and 272. Similarly, virtual processors 244, 248, 252, 256, 260, and 264 are assigned to LPARs 212 and 216 through assignment to pool 296. Physical processors 276, 280, 284, 288 and 292 are also assigned to LPARs 212 and 216 through their assignment to pool 296. Thus, hypervisor 232 may represent the instruction set of any of virtual processors 244, 248, 252, 256, 260, or 264 as the union of the instruction sets of physical processors 276, 280, 284, 288 and 292.

In further embodiments, the instruction set of the virtual processor may be used for the assignment of a task to the virtual processor. A task may be assigned to one virtual processor rather than another, because the instruction set of the virtual processor may support the instructions of the task. In addition, the instruction set of the virtual processor may determine the version of a program which runs on the virtual processor. The program may include several versions, which depend upon the available instruction set.

Similarly, in some embodiments of a heterogeneous multiprocessor computer, a hypervisor or kernel or other system module may represent the instruction set of the computer as a whole as the union of the instruction sets of the individual physical processors contained in the computer. This instruction set may be used to select a version of a program to run. For example, a kernel may select among several instruction-set specific versions of a routine to load when the kernel boots. Traditional systems with a single processor type typically define the instruction set supported on a per machine basis. By setting the per machine attribute for these heterogeneous multiprocessor systems as if they were a traditional uniform system, legacy operating systems may be able to run with only minor modifications.

The number, arrangement, and assignments of physical processors, virtual processors, LPARs, and the pool of virtual processors in the system of FIG. 2 are for explanation only. They are not a limitation of the present invention. A system for assigning instructions to processors in a heterogeneous multiprocessing computer supporting multiple logical partitions may include any number, arrangement, or assignment of physical processors, virtual processors, LPARs, and pools of virtual processors as may occur to those of skill in the art. In particular, some embodiments may omit LPARs, hypervisors, or virtual processors. In a few embodiments, an operating system, OS kernel, or other module may assign tasks to processors which support their instructions.

Figure 3:
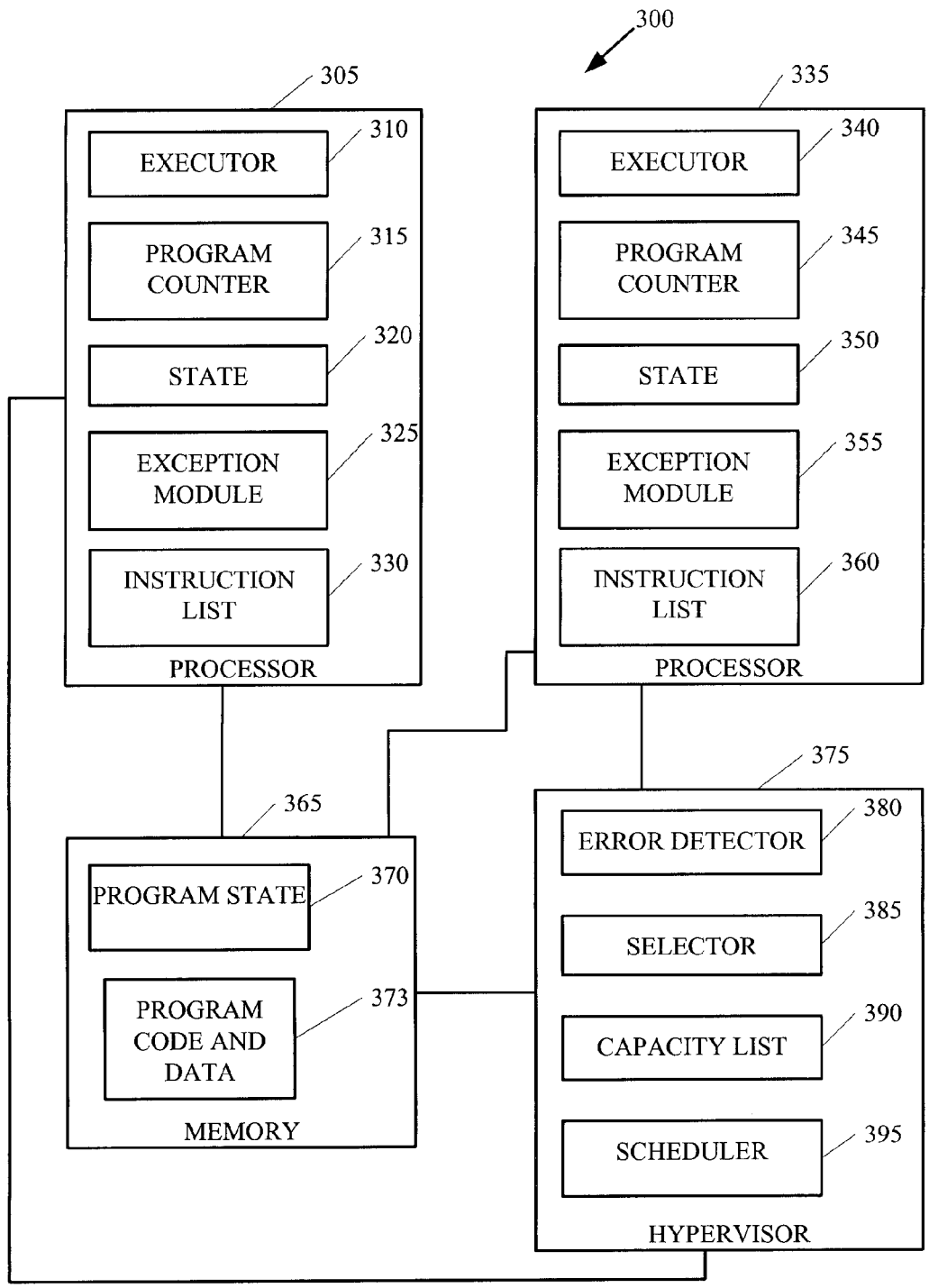
FIG. 3 depicts an embodiment of an apparatus to assign tasks to physical processors supporting the tasks in a heterogeneous multiprocessor computer.

For further explanation, FIG. 3 sets forth a block diagram illustrating an exemplary apparatus 300 for assigning tasks to processors. FIG. 3 includes processors 305 and 335, memory 365, and hypervisor 375. In the embodiment of FIG. 3, processors 305 and 335 support different instructions. For example, processor 335 may support an AltiVec instruction or floating point arithmetic, while processor 305 may not support those instructions. In many embodiments, the processors may belong to the same family of processors. In a few embodiments, the processors may support different binary formats. For example, processor 305 may be an x86 processor and processor 335 may be a Power PC processor. Processors 305 and 335 include executors 310 and 340, program counters 315 and 345, states 320 and 350, exception modules 325 and 355, and instruction lists 330 and 360.

The executors 310 and 340 perform the operations called for by instructions. The program counters 315 and 345 tell the executors 310 and 340 the addresses of the next instructions for processing. In many embodiments, the program counters consist of registers. State modules 320 and 350 maintain the state of the processing of instructions. They may also consist of registers. Exception modules 325 and 355 detect and signal exceptions encountered in executing instructions. Exception modules 325 and 355 may, for example, signal exceptions from attempting the execution of instructions not supported by processor 305 and 335, respectively. Instruction lists 330 and 360 are lists of instructions supported by processor 305 and 335, respectively.

Memory 365 includes program state 370 and program code and data 373. Program state 370 may store intermediate values of programs that are shifted in and out of processors 305 and 335. For example, the programs may share time slices in the processors. When a program has completed its time slice in processor 305, the data in state 320 may be written to program state 370. Conversely, when the program resumes its time slice in processor 305, the data about the program in program state 370 may be restored to state 320. Program code and data 373 includes the instructions and data for programs. The program counters 315 and 345 may point to addresses of instructions in program code and data 373.

Hypervisor 375 includes error detector 380, selector 385, capacity list 390, and scheduler 395. Error detector 380 may receive an exception generated by error module 325 or 355 from an attempt to execute an unsupported instruction. In such a case, selector 385 may select a processor that supports the instruction. For example, exception module 325 may generate an exception from processor 305's attempt to execute an AltiVec instruction, which processor 305 does not support. Under those circumstances, selector 385 may select processor 335, which supports the instruction, to execute it. Capacity list 390 may contain a table of processors and supported instructions for use by selector 385.

Scheduler 395 may assign the task which includes the unsupported instruction to a processor which supports the instruction. In the above example, scheduler 395 may assign the task which includes the AltiVec instruction to processor 335. In some embodiments, hypervisor 375 may assign tasks to a processor by placing them on a queue to run for a time slice on the processor. When it is the task's turn to execute, the program state of the task may be loaded into the processor and the program counter of the processor may be set to point to the next instruction to be executed in the task. In other embodiments, scheduler 395 may preempt a currently executing task in order to replace it with the task reassigned from the other processor. For example, the task that could not execute on processor 305 may have a high priority, or the task executing on processor 335 may be the only task available to run on processor 305.

In some embodiments, apparatus 300 may enable a program to run on the combination of instruction sets of the physical processors comprising the apparatus. The program may run on one physical processor until the processor encounters an unsupported instruction. The program may then be switched to another physical processor which supports the instruction. In further embodiments, the program may be switched back to the first processor when the second processor encounters an unsupported instruction which is supported on the first processor.

In a few embodiments, apparatus 300 may enable running a program whose instructions are not supported by any one physical processor on apparatus 300 without changing the kernel. The hypervisor may transfer the program from physical processor to physical processor as needed to execute the instructions of the program.

The diagram of FIG. 3 is for explanation, and not for limitation. Data processing systems useful according to various embodiments of the present invention may omit a hypervisor, and may include other components as will occur to those of skill in the art. In some embodiments, a kernel of an operating system may assign a task to a processor which supports the instruction.

Figure 4:
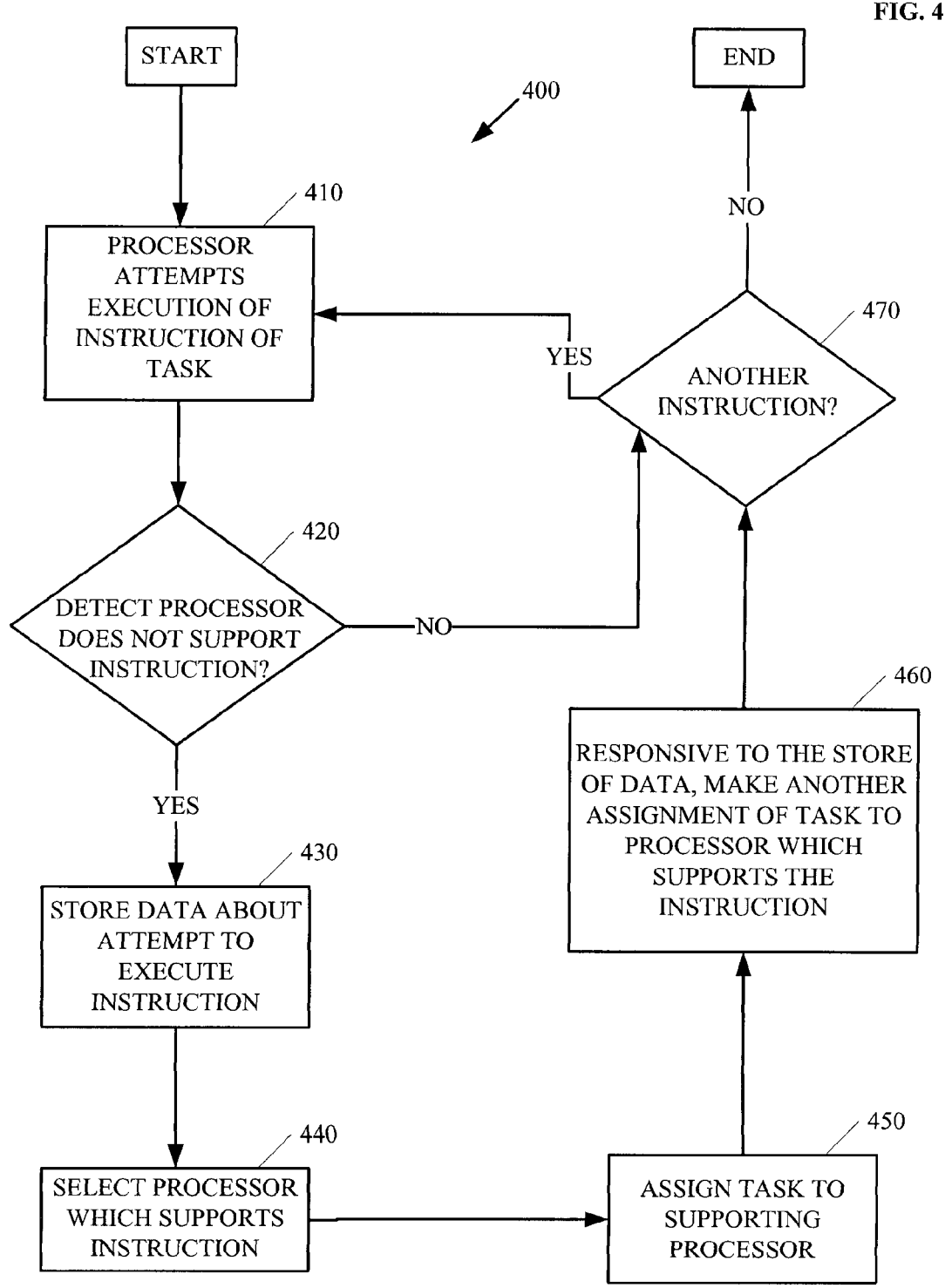
FIG. 4 is a flowchart of an embodiment of a method to assign tasks to physical processors supporting the tasks in a heterogeneous multiprocessor computer.

FIG. 4 depicts a flowchart 400 of an embodiment of a method to assign a task to a processor which supports an instruction of the task. The method may be performed by an apparatus such as apparatus 300 of FIG. 3. Flowchart 400 of FIG. 4 begins with an attempted execution of an instruction of a task by a processor (element 410). The task may include multiple instructions, such as a process or a thread.

The method may include detecting whether the processor does not support the instruction (element 420). If the processor does support the instruction, the method may include checking whether there are additional instructions (element 470). If the processor does not support the instruction, the processor may generate an exception from attempting to execute an unsupported instruction. The exception may be received by an operating system kernel or a hypervisor or other module which schedules tasks on processors (scheduling module). The scheduling module may store data about the attempt to execute the instruction (element 430). The data may include the type of instruction, the task that included the instruction, and the processor that did not support the instruction. The data may also include the state of the task on the processor which did not support the instruction.

The scheduling module may select a processor which supports the instruction (element 440). The scheduling module may maintain a table of processors and supported instructions and may check the table to determine a processor on which to schedule the instruction.

The method may include assigning the task containing the instruction to the processor which supports it (element 450). A scheduling module may place the task on a queue for the processor. When it is the task's turn to run, the scheduling module may load the state of the task into the processor and set the processor's program counter to the instruction. The task may again arise for scheduling later. The scheduling module may schedule the task on a processor which supports the instruction (element 460), based on an examination of the data stored in element 430 about the attempted execution of the instruction on a processor which did not support it.

If there are additional instructions for executing on processors (element 470), then elements 410 through 460 may be repeated. Otherwise, the method of flowchart 400 may end.

The elements of flowchart 400 are for illustration and not for limitation. In alternative embodiments, additional elements may be included, some of the elements of flowchart 400 may be omitted, or the elements may be performed in a different order.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for assigning a task containing an instruction to a physical processor supporting the instruction, the computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for assigning tasks to processors. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of assigning tasks to processors of a computer, the method comprising:
   representing, to an operating system executing on a logical partition, a virtual instruction set of each of a plurality of virtual processors assigned to the logical partition as a union of physical instruction sets supported by each of plural physical processors which are assigned to the logical partition by way of the virtual processors;
   assigning, by the operating system, a task to a first virtual processor of the plurality of virtual processors based on the virtual instruction set;
   dispatching the first virtual processor to a first physical processor of the plural physical processors for execution of the assigned task;
   detecting an attempt to execute an instruction of the task on the first physical processor that is not part of the physical instruction set supported by the first physical processor;
   selecting a second physical processor of the plural physical processors that does support the instruction; and
   dispatching the first virtual processor to the second physical processor for execution of the assigned task including the instruction.

2. The method of claim 1, further comprising:
   storing data about the attempt to execute the instruction; and
   task dispatching the first virtual processor to a third physical processor of the plural physical processors that does support the instruction in response to the storing.

3. The method of claim 1, wherein:
   the task comprises a process; and
   the detecting comprises detecting an attempt to execute an instruction of the process.

4. The method of claim 1, wherein:
   the task comprises a thread; and
   the detecting comprises detecting an attempt to execute an instruction of the thread.

5. The method of claim 1, wherein the dispatching is performed by a hypervisor.

6. The method of claim 1, wherein the assigning is performed by a kernel of the operating system.

7. The method of claim 1, wherein the computer is a heterogeneous multiprocessor computer containing the plural physical processors that include the first and second physical processors, and the method further comprises:
   executing a program on the heterogeneous multiprocessor computer, the executing based upon the representing.

8. The method of claim 7, wherein the executing comprises selecting, by a kernel of the operating system running on the logical partition of the heterogeneous multiprocessor computer, among instruction-set specific versions of the program to load during booting.

9. A method of administering a heterogeneous multiprocessor computer including a hypervisor managing one or more logical partitions (LPARs), each LPAR including an operating system, the method comprising:
   by the hypervisor, performing the steps of:
   assigning each of a first plurality of physical processors to a respective one of a second plurality of virtual processors, each physical processor supporting an instruction set, wherein at least one of the supported instruction sets of one of the physical processors is different from at least one other of the supported instruction sets of another of the physical processors;
   assigning the virtual processors to the one or more LPARs, wherein the respective virtual processors, to which are assigned the physical processors that support the one and the other different instruction sets, are assigned to a common LPAR; and
   representing, to the operating system of the common LPAR, a virtual instruction set of each virtual processor assigned to the common LPAR as a union of the instruction sets supported by the physical processors assigned to the virtual processors that are assigned to the common LPAR; and
   assigning, by the operating system, a task to one of the virtual processors based on the corresponding virtual instruction set.

10. The method of claim 9, the method further comprising:
    executing a program on the heterogeneous multiprocessor computer, the executing based upon the representing.

11. The method of claim 10, wherein the executing comprises selecting, by the operating system, among instruction-set specific versions of the program to load during booting.

12. An apparatus to assign tasks to processors, the apparatus comprising:
    physical processors comprising a first physical processor that supports a first instruction set which includes a first instruction and a second physical processor that supports a second instruction set which does not include the first instruction;
    a representer configured to represent, to an operating system executing on a logical partition, a virtual instruction set of each of a plurality of virtual processors assigned to the logical partition as a union of first and second instruction sets supported by the first and second physical processors which are assigned to the logical partition by way of the virtual processors;
    an assigner configured to assign a task comprising the first instruction to one of the virtual processors based on the virtual instruction set;
    a detector to detect an attempt to execute the first instruction of the task on the second physical processor;
    a selector to select the first physical processor; and
    a scheduler to dispatch the virtual processor assigned the task to the first physical processor.

13. The apparatus of claim 12, wherein the representer is a hypervisor, the hypervisor comprising the detector, the selector, and the scheduler.

14. The apparatus of claim 12, wherein the assigner is a kernel of the operating system.

15. The apparatus of claim 12, the apparatus comprising a computer.

16. A computer program product to assign tasks to processors, the computer program product comprising a non-transitory computer useable medium having a computer readable program, wherein the computer readable program when executed on a computer causes the computer to:
    represent, to an operating system executing on a logical partition, a virtual instruction set of each of a plurality of virtual processors assigned to the logical partition as a union of physical instruction sets supported by each of plural physical processors which are assigned to the logical partition by way of the virtual processors;

assign, by the operating system, a task to a first virtual processor of the plurality of virtual processors based on the virtual instruction set;

dispatch the first virtual processor to a first physical processor of the plural physical processors for execution of the assigned task;

detect an attempt to execute an instruction of the task on the first physical processor that is not part of the physical instruction set supported by the first physical processor;

select a second physical processor of the plural physical processors that does support the instruction; and task dispatch the first virtual processor to the second physical processor for execution of the assigned task including the instruction.

17. The computer program product of claim 16, wherein the computer readable program when executed on a computer further causes the computer to:

store data about the attempt to execute the instruction; and dispatch the first virtual processor to a third physical processor of the plural physical processors that supports the instruction in response to the storing.

18. The computer program product of claim 16, wherein the computer readable program which causes the computer to detect an attempt to execute an instruction of a task comprises a computer readable program which causes the computer to detect an attempt to execute an instruction of a process.

19. The computer program product of claim 16, wherein the computer readable program which causes the computer to detect an attempt to execute an instruction of a task comprises a computer readable program which causes the computer to detect an attempt to execute an instruction of a thread.

20. The computer program product of claim 16, wherein the computer readable program which causes the computer to dispatch the first virtual processor to the second physical processor comprises a computer readable program which causes a hypervisor of the computer to dispatch the first virtual processor to the second physical processor.

21. The computer program product of claim 16, wherein the computer readable program which causes the computer to assign the task to the first virtual processor comprises a computer readable program which causes a kernel of the operating system of the computer to assign the task to the first virtual processor.

* * * * *